W. W. HUTCHINGSON.
TROLLEY.
APPLICATION FILED AUG. 1, 1908.
963,571. Patented July 5, 1910.
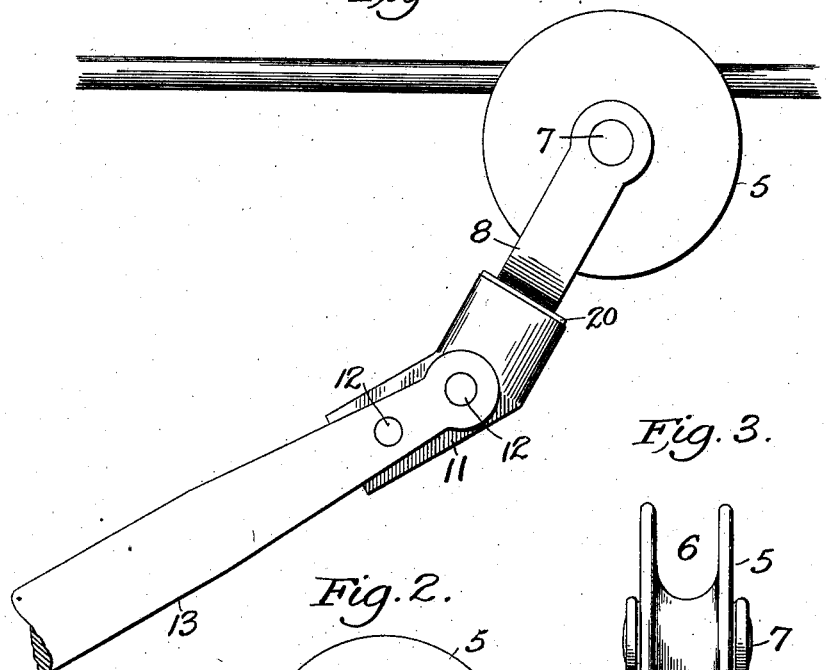
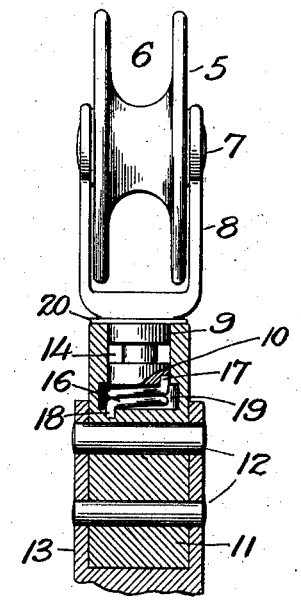
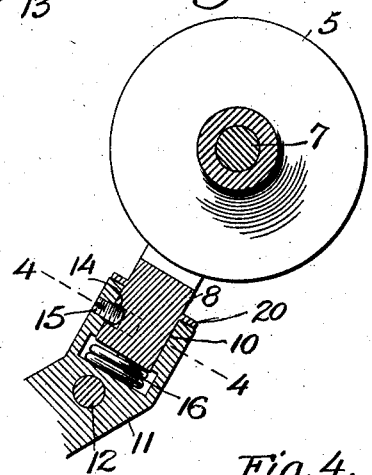
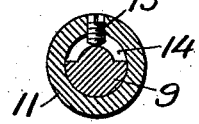
WITNESSES
James F. Duhamel
G. H. Ackman Jr.
INVENTOR,
William W. Hutchingson,
BY
Victor J. Evans
ATTORNEYS

UNITED STATES PATENT OFFICE.

WILLIAM W. HUTCHINGSON, OF BROOKLYN, NEW YORK.

TROLLEY.

963,571.  Specification of Letters Patent.  Patented July 5, 1910.

Application filed August 1, 1908. Serial No. 446,443.

*To all whom it may concern:*

Be it known that I, WILLIAM W. HUTCHINGSON, a citizen of the United States, residing at Brooklyn, in the county of Kings and State of New York, have invented new and useful Improvements in Trolleys, of which the following is a specification.

This invention relates to trolleys and its object is to provide certain means to retain the trolley in engagement with its wire and to decrease the tendency of same to leave the wire as will be more fully described in the following specification, set forth in the claim and illustrated in the drawings, where:

Figure 1 is a side elevation of the improved trolley on its wire. Fig. 2 is a sectional view through same. Fig. 3 is a sectional view at a right angle to above. Fig. 4 is a sectional view on the line 4—4 of Fig. 2.

This invention is adapted to retain the trolley on its wire and in order to accomplish this desirable end it is found necessary to provide the trolley with means which permit of its turning on its stem so that it will pass uneven points on the wire and not be thrown off by same nor will it leave the wire in turning curves as is frequently the case.

The trolley wheel 5 is of ordinary construction with the groove 6 for the wire and is mounted on the axle 7 which is journaled in the yoke 8. This yoke has at its lower end a stem 9 which enters a socket 10 in a block 11 which is secured by means of the pins 12 to the upper end of the trolley pole 13, and in one side of the stem 9 is a groove 14 extending about half way around the stem to receive the stud 15 projecting from the block 11. This stud allows the stem to turn in the block but not pass a right angle from its normal position and to return the trolley to its position parallel with the trolley wire a coiled spring 16 is seated in the enlarged lower end of the socket and its ends 17 and 18 enter perforations in the stem and in the block so that when the stem is turned the spring is put under tension and when the force that turns the stem is released the spring returns the trolley to the position to carry the wire in its circumferential groove. The spring expands when the stem is turned one way and contracts in the other so to provide for the expansion the enlarged portion 19 of the socket and to keep out dirt and moisture the stem has a flange 20 at its upper end. The trolley as so constructed will follow the trolley wire notwithstanding its imperfections and curves and its extreme simplicity and few parts will prevent its getting out of order or easily wearing.

It is obvious that the parts may be altered or otherwise arranged without departing from the essential features above described.

What I claim as new and desire to secure by Letters Patent is:

In a trolley, the combination with a trolley pole and socketed block, of a yoke for the wheel, a stem at the lower end of the yoke and having a groove partly surrounding it, a pin in the block and entering the groove, a spring at the bottom of the socket and attached to same and the stud, and a flange on the stem at the mouth of the socket.

In testimony whereof I affix my signature in presence of two witnesses.

WILLIAM W. HUTCHINGSON.

Witnesses:
THOMAS F. McDONOUGH,
THOMAS N. SHANNON.